(12) United States Patent
Hulse et al.

(10) Patent No.: US 8,570,905 B2
(45) Date of Patent: Oct. 29, 2013

(54) ADAPTIVE ENTERPRISE SERVICE BUS (ESB) RUNTIME SYSTEM AND METHOD

(75) Inventors: Brian Hulse, Awbridge (GB); Callum P. Jackson, Fareham (GB)

(73) Assignee: International Business Machines Corporation, Armonk, NY (US)

( * ) Notice: Subject to any disclaimer, the term of this patent is extended or adjusted under 35 U.S.C. 154(b) by 770 days.

(21) Appl. No.: 12/238,472

(22) Filed: Sep. 26, 2008

(65) Prior Publication Data

US 2010/0080148 A1    Apr. 1, 2010

(51) Int. Cl.
H04L 12/28    (2006.01)

(52) U.S. Cl.
USPC ............................ 370/257; 370/254; 370/351

(58) Field of Classification Search
USPC .......................................................... 370/255
See application file for complete search history.

(56) References Cited

U.S. PATENT DOCUMENTS

| | | | | |
|---|---|---|---|---|
| 5,511,198 | A * | 4/1996 | Hotta ............................ | 717/156 |
| 5,880,959 | A * | 3/1999 | Shah et al. ...................... | 700/97 |
| 7,783,782 | B2 * | 8/2010 | Cromp et al. .................. | 709/249 |
| 7,788,542 | B2 * | 8/2010 | Little .............................. | 714/43 |
| 2003/0004674 | A1 * | 1/2003 | Thurman et al. .............. | 702/123 |
| 2003/0036940 | A1 | 2/2003 | Leymann et al. | |
| 2005/0264581 | A1 * | 12/2005 | Patrick et al. .................. | 345/594 |
| 2006/0241931 | A1 * | 10/2006 | Abu el Ata et al. ............. | 703/27 |
| 2006/0241954 | A1 | 10/2006 | Jeng et al. | |
| 2006/0285489 | A1 * | 12/2006 | Francisco et al. ............. | 370/229 |
| 2007/0038780 | A1 * | 2/2007 | Christensen et al. ......... | 709/246 |
| 2007/0069855 | A1 * | 3/2007 | Boland et al. ................ | 340/10.1 |
| 2007/0143447 | A1 * | 6/2007 | Beckum et al. ............... | 709/219 |
| 2007/0162421 | A1 * | 7/2007 | Pang et al. ........................ | 707/2 |
| 2007/0240102 | A1 * | 10/2007 | Bello et al. ..................... | 717/104 |
| 2008/0005208 | A1 * | 1/2008 | Vaswani et al. ............... | 707/206 |
| 2008/0022257 | A1 * | 1/2008 | Baartman et al. ............. | 717/106 |
| 2008/0069082 | A1 * | 3/2008 | Patrick .......................... | 370/351 |
| 2008/0069124 | A1 * | 3/2008 | Patrick .......................... | 370/401 |
| 2008/0133646 | A1 * | 6/2008 | Azulai .......................... | 709/202 |
| 2008/0140759 | A1 * | 6/2008 | Conner et al. ................ | 709/201 |
| 2008/0140857 | A1 * | 6/2008 | Conner et al. ................ | 709/236 |
| 2008/0189679 | A1 * | 8/2008 | Rodriguez et al. ............ | 717/105 |
| 2008/0201719 | A1 * | 8/2008 | Daniel et al. .................. | 718/105 |
| 2008/0250097 | A1 * | 10/2008 | Angelini et al. .............. | 709/202 |
| 2008/0297305 | A1 * | 12/2008 | Little .............................. | 340/5.1 |
| 2008/0306751 | A1 * | 12/2008 | Conroy et al. .................... | 705/1 |

(Continued)

OTHER PUBLICATIONS

Credle et al. "Patterns: SOA Design Using WebSphere Message Broker and WebSphere ESB"—(2007).*

*Primary Examiner* — Marsha D Banks Harold
*Assistant Examiner* — Christopher Wyllie
(74) *Attorney, Agent, or Firm* — Gibb & Riley, LLC

(57) ABSTRACT

Disclosed are embodiments of an adaptive enterprise service bus (ESB) runtime system and an associated method, which build, at a restart, only the most advantageous path configuration between composable units (e.g., between applications and/or between primitives within a single application). Specifically, during the execution of instantiations of modeled paths and branches thereof, metrics (e.g., the number of times each flow and each branch are activated, the CPU usage associated with building each flow and each branch, etc.) are collected. Then, at a restart of the runtime system, a cost-benefit analysis is performed on the collected metrics and, based on the results of this cost-benefit analysis, only selected ones of the paths and the branches thereof are built (e.g., paths and branches for which operational usefulness outweighs building costs). Other paths and branches are built only as required, during running of the runtime system.

20 Claims, 3 Drawing Sheets

(56) References Cited

U.S. PATENT DOCUMENTS

| | | | |
|---|---|---|---|
| 2008/0307211 A1* | 12/2008 | An et al. | 713/1 |
| 2009/0006167 A1* | 1/2009 | Toussaint et al. | 705/8 |
| 2009/0064271 A1* | 3/2009 | Ng et al. | 726/1 |
| 2009/0070456 A1* | 3/2009 | Brown et al. | 709/224 |
| 2009/0077251 A1* | 3/2009 | Brown et al. | 709/230 |
| 2009/0164593 A1* | 6/2009 | Birsan et al. | 709/206 |
| 2009/0182565 A1* | 7/2009 | Erickson et al. | 705/1 |
| 2009/0193096 A1* | 7/2009 | Boyer et al. | 709/217 |
| 2009/0201812 A1* | 8/2009 | Dettori et al. | 370/235 |
| 2009/0232031 A1* | 9/2009 | Vasseur et al. | 370/256 |
| 2009/0245253 A1* | 10/2009 | Chen et al. | 370/390 |
| 2009/0259482 A1* | 10/2009 | Baxter et al. | 705/1 |
| 2009/0287638 A1* | 11/2009 | Bestgen et al. | 707/2 |
| 2009/0287845 A1* | 11/2009 | Joshi et al. | 709/238 |
| 2009/0292797 A1* | 11/2009 | Cromp et al. | 709/223 |
| 2009/0319686 A1* | 12/2009 | Watanabe | 709/240 |
| 2010/0005466 A1* | 1/2010 | MacFarlane et al. | 718/100 |
| 2010/0017368 A1* | 1/2010 | Mao et al. | 707/3 |
| 2010/0017782 A1* | 1/2010 | Chaar et al. | 717/101 |
| 2010/0054118 A1* | 3/2010 | Hughes et al. | 370/216 |
| 2010/0080148 A1* | 4/2010 | Hulse et al. | 370/257 |
| 2010/0115251 A1* | 5/2010 | Hulse et al. | 712/234 |
| 2010/0161362 A1* | 6/2010 | Shapira et al. | 705/7 |
| 2011/0196824 A1* | 8/2011 | Maes | 707/610 |
| 2011/0258262 A1* | 10/2011 | Bezdicek et al. | 709/206 |

* cited by examiner

ADAPTIVE ENTERPRISE SERVICE BUS (ESB) RUNTIME SYSTEM AND METHOD

BACKGROUND

1. Field of the Invention

The embodiments of the invention generally relate to an enterprise service bus (ESB) runtime system and, more particularly, to an adaptive ESB runtime system that builds only the most advantageous configuration.

2. Description of the Related Art

Within conventional enterprise service bus (ESB) architectures, a bus provides the physical connections that allow communication between various applications and/or between primitives (i.e., nodes or elements) within an application and an enterprise service bus (ESB) provides the software infrastructure that enables such between-application or within-application communications. An ESB runtime system typically has two construction stages. The first construction stage is a tooling or design stage. Specifically, during this tooling stage, a net of composable units (e.g., applications, primitives within applications, etc.) are wired together by paths (i.e., mediation flows) in a model in order to form an overall flow that conceptually describes the particular function of the ESB runtime system. A natural consequence of this tooling stage is that each path between composable units may include a number of different branches (or different routes). The tooling stage can be accomplished, for example, using an integration developer (e.g., WebSphere® Integration Developer software by International Business Machines Corp. (IBM)).

The second construction stage is a path building stage (i.e., a stage wherein executable instantiations of the tooled paths and branches thereof are rendered into the ESB runtime system). Typically, this path building process is repeated at the start of each running of the runtime system and includes the simultaneous building of each particular path and each branch within each particular path. Alternatively, only some branches of each path will be conditionally built, based upon some runtime context. This submission hinges on the conditional aspects of some paths. The path building stage can be accomplished, for example, using a runtime environment building product (e.g., WebSphere® ESB software by International Business Machines Corp. (IBM)).

The path building stage (i.e., the generation of the runtime components for each path and each branch within each path) may be very costly. Furthermore, different branches in a particular path may be more costly to create than others. For example, in a particular path, a particular branch may require the transformation of data using extensible stylesheet language transformations (xslt) and, thus, may be relatively costly to set up, especially if the xslt is large. Additionally, if the particular branch is used infrequently (i.e., has minimal operational usefulness), the costly initialization of that particular branch may outweigh its operational usefulness. It would be advantageous to provide an ESB runtime system that does not initialize all branches equally at runtime, but rather considers which paths and branches thereof would be most advantageous (e.g., given a cost-benefit analysis) to build.

SUMMARY

In view of the foregoing, disclosed herein are embodiments of an adaptive enterprise service bus (ESB) runtime system and an associated method, which build, at a restart, only the most advantageous path configuration between composable units (e.g., between applications and/or between primitives within a single application). Specifically, during the execution of instantiations of modeled paths and branches thereof, metrics (e.g., the number of times each flow and each branch are activated, the CPU usage associated with building each flow and each branch, etc.) are collected. Then, at a restart of the runtime system, a cost-benefit analysis is performed on the collected metrics and, based on the results of this cost-benefit analysis, only selected ones of the paths and the branches thereof are built (e.g., paths and branches for which operational usefulness outweighs building costs). Other paths and branches are built only as required, during running of the runtimes system.

More particularly, disclosed herein are embodiments of an adaptive enterprise service bus (ESB) runtime system. The system embodiments comprise a processor, a server, a monitor, a database and an analyzer. The processor is operable to receive a model for an enterprise system bus (ESB). This model can comprise a plurality of paths that will enable communications across a bus between multiple composable units (e.g., between different applications, between primitives (i.e., nodes or elements) of a single application, etc.). At least one of these paths can comprise a plurality of different branches. The processor can further be operable to build instantiations of the various paths and branches thereof. The server can be operable to execute, during each running of the runtime system, instantiations of the paths and the branches that have been built by the processor. The monitor can be operable to collect metrics for the paths and the branches, as the instantiations are executed by the server. These metrics can indicate operational usefulness of each path or branch thereof as well as a cost associated with building each particular path and each particular branch within each path. The monitor can further be operable to store those collected metrics in a database. The analyzer can be operable to access the database and to perform a cost-benefit analysis using the collected metrics from one or more previous runnings of the runtime system (e.g., to compare the operation usefulness of each path and/or each branch within each path with a cost associated with building each path and/or each branch within each path). Finally, the processor can further be operable to alter which paths and/or branches thereof are built at a restart of the runtime system, based on the results of the cost-benefit analysis, so as to ensure that the most advantageous path configuration is built. Specifically, at a restart of the runtime system and based on the results of the cost-benefit analysis, the processor will build instantiations of only selected ones of the paths and the branches thereof (e.g., paths and branches for which operational usefulness outweighs building costs). Other paths and branches are built only as required (i.e., on demand), during running of the runtime system.

Also disclosed herein are embodiments of an adaptive enterprise service bus (ESB) runtime method. The method embodiments comprise receiving a model for an enterprise system bus (ESB). This model can comprise a plurality of paths that will enable communications across a bus between multiple composable units (e.g., between different applications, between primitives (i.e., nodes or elements) within a single application, etc.). At least one of these paths can comprise a plurality of different branches.

Then, instantiations of the various paths and branches thereof are built at the initial start-up of the runtime system and/or, as required, during an initial running of the runtime system.

Next, during each running of a runtime system, built instantiations of the paths and the branches are executed. Furthermore, during this execution process, metrics for the paths and the branches thereof are collected and stored. The metrics can indicate operational usefulness of each path or branch thereof and also a cost associated with building each particular path and each particular branch within each path.

After such metrics are collected and stored, a cost-benefit analysis can be performed using the metrics from one or more previous runnings of the runtime system (e.g., to compare the operation usefulness of each path and/or each branch within each path with a cost associated with building each path and/or each branch within each path). Then, at a restart of the runtime system and based on the results of the cost-benefit analysis, instantiations of only selected ones of the paths and the branches are built (e.g., paths and branches for which operational usefulness outweighs building costs). Other paths and branches are built only as required, during the running of the runtime system.

Also disclosed herein are embodiments of a computer program product for the above-described adaptive enterprise service bus (ESB) runtime method. The computer program product comprises a computer usable medium having computer usable program code embodied therewith and this computer usable program code is configured to perform the above-described method.

BRIEF DESCRIPTION OF THE SEVERAL VIEWS OF THE DRAWINGS

The embodiments of the invention will be better understood from the following detailed description with reference to the drawings, which are not necessarily drawing to scale and in which.

DETAILED DESCRIPTION OF EMBODIMENTS

Figure 1:
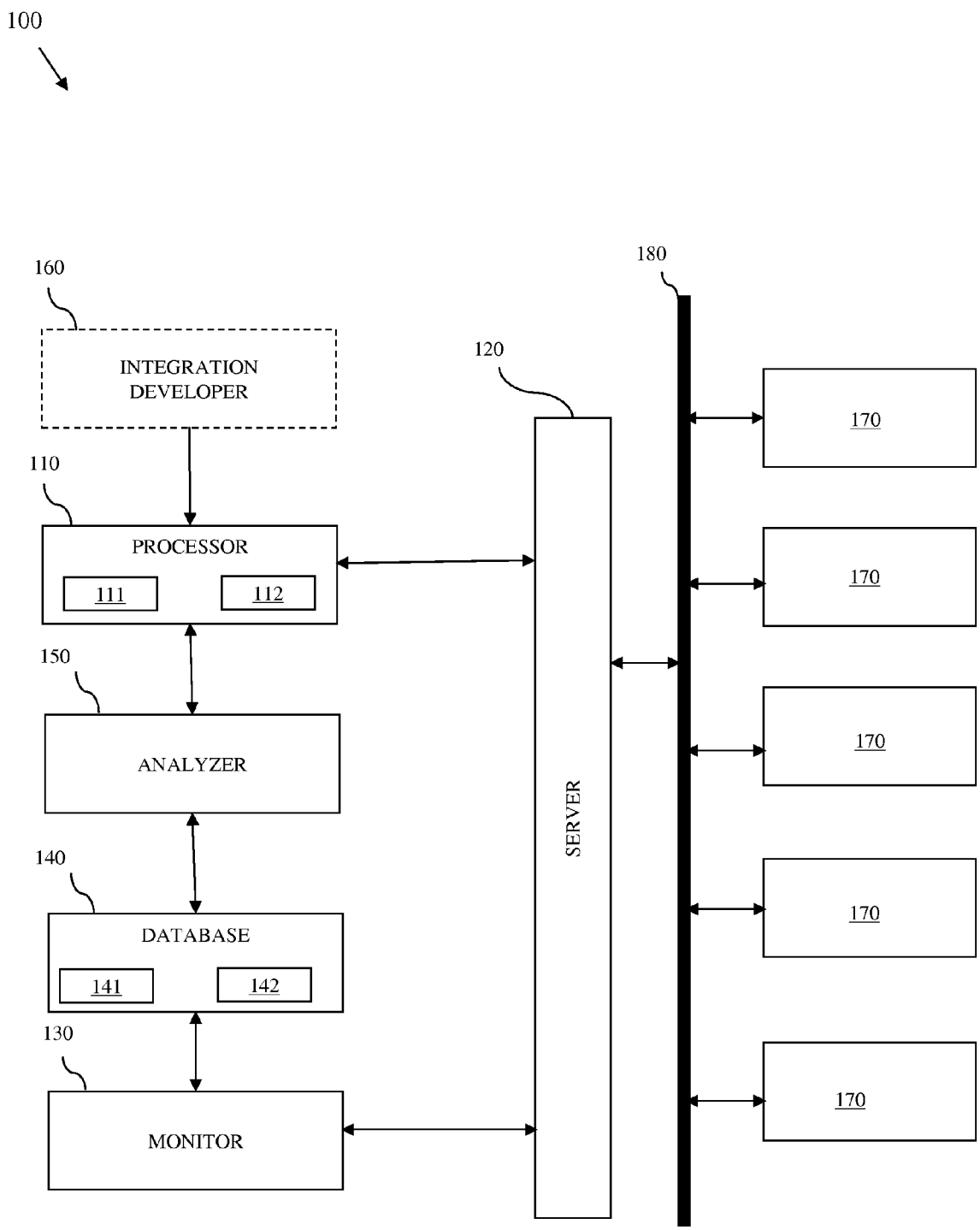
FIG. 1 is a schematic diagram illustrating an embodiment of the system of the present invention.

The embodiments of the invention and the various features and advantageous details thereof are explained more fully with reference to the non-limiting embodiments that are illustrated in the accompanying drawings and detailed in the following description.

As mentioned above, within conventional enterprise service bus (ESB) architectures, an ESB runtime system typically has two construction stages. The first construction stage is a path tooling or design stage. Specifically, during the tooling stage, a net of composable units, for example, different applications and/or primitives (i.e., nodes or elements) of a single application, are wired together by paths (i.e., mediation flows) in a model in order to form an overall flow that conceptually describes the particular function of the ESB runtime system. A natural consequence of this tooling stage is that each path may include a number of branches (or routes). The second construction stage is a path building stage (i.e., a stage wherein executable instantiations of the tooled paths and branches thereof are built into the ESB runtime system). Typically, this path building process is repeated at the start of each running of the runtime system and includes the simultaneous building of each particular path and each branch within each particular path. Alternatively, only some branches of each path will be conditionally built, based upon some runtime context. This submission hinges on the conditional aspects of some paths.

The path building stage (i.e., the generation of the runtime components for each path and each branch within each path) may be very costly. Furthermore, different branches in a particular path may be more costly to create than others. For example, in a particular path, a particular branch may require the transformation of data using extensible stylesheet language transformations (xslt) and, thus, may be relatively costly to set up, especially if the xslt is large. Additionally, if the particular branch is used infrequently (i.e., has minimal operational usefulness), the costly initialization of that particular branch may outweigh its operational usefulness. It would be advantageous to provide an ESB runtime system that does not initialize all branches equally at runtime, but rather considers which paths and branches thereof would be most advantageous (e.g., given a cost-benefit analysis) to build.

In view of the foregoing, disclosed herein are embodiments of an adaptive enterprise service bus (ESB) runtime system and an associated method, which build, at a restart, only the most advantageous path configuration between composable units (e.g., between applications and/or between primitives within a single application). Specifically, during the execution of instantiations of modeled paths and branches thereof, metrics (e.g., the number of times each flow and each branch are activated, the CPU usage associated with building each flow and each branch, etc.) are collected. Then, at a restart of the runtime system, a cost-benefit analysis is performed on the collected metrics and, based on the results of this cost-benefit analysis, only selected ones of the paths and the branches thereof are built (e.g., paths and branches for which operational usefulness outweighs building costs). Other paths and branches are built only as required, during running of the runtime system.

More particularly, referring to FIG. 1, disclosed herein are embodiments of an adaptive enterprise service bus (ESB) runtime system 100. The system 100 embodiments comprise a processor 110, a server 120, a monitor 130, a database 142 and an analyzer 150.

The processor 110 can be adapted to (i.e., is operable to) receive a model for an enterprise system bus (ESB) (e.g., from an integration developer 160). This model can comprise a plurality of paths (i.e., mediation flows) that will enable communications across a bus 180 between multiple different composable units 170 (e.g., between different applications, between primitives (i.e., nodes or elements) within a single application, etc.). At least one of these paths can comprise a plurality of different branches (i.e., different routes) that can be used to establish this communication. The model specifically identifies each path and branch thereof.

The processor 110 can further comprise a runtime branch builder (RBB) 111 adapted to (i.e., operable to) build instantiations of the various paths and branches thereof from the model and a global runtime branch director (GRBD) 112 that directs (i.e., controls) the building of paths and branches thereof by the RBB 111. For example, the processor 110 and, particularly, the GRBD 112 can be programmed so that during an initial running of the runtime system 100, the RBB 111 is directed to and builds model paths and branches thereof only as required (i.e., on-demand). Alternatively, the processor 110 and, particularly, the GRBD 112 can be programmed so that, at an initial start-up of the runtime system 100, the RBB 111 is directed to and builds all of the model paths and the branches thereof. Alternatively, the processor 110 and, particularly, the GRBD 112 can be programmed to select a portion of the model paths and branches, based on pre-loaded historical data 141 (e.g., stored in a data repository 140). This pre-loaded historical data 141 can comprise, for example, use statistics for similar paths and/or branches in similar runtime systems, costs associated with building such similar paths and/or branches, etc. The processor 110 and, particularly, the GRBD 112 can be further be programmed so that, at the initial start-up of the runtime system 100, the RBB 111 is directed to and builds only that selected portion (i.e., a skeletal ESB architectural structure) and further so that, during the initial running of the runtime system 100, the RBB 111 is direct to and builds any additional portions of the model paths and branches that are required (i.e., on-demand).

It should be noted that the RBB 111 can be driven or controlled by a GRBD 112, as discussed above. However, alternatively, the RBB 111 can be driven automatically by the arrival of data at a particular flow branch that needs processing. In this way, if a flow branch has no runtime instantiation, when the branch needs to be run, it can be instantiated on demand.

The server 120 can be adapted to (i.e., operable to) execute, during each running of the runtime system 100, instantiations of the paths and the branches thereof that have been built by the RBB 111 of the processor 110 in order to allow communication between the various composable units 170 over the bus 180.

Additionally, the monitor 130 can be adapted to (i.e., operable to) collect metrics for the paths and the branches, as the instantiations are executed (i.e., during each running of the runtime system) by the server 120. For example, the monitor 130 can comprise a global runtime metric collector (GRMC) (i.e., a separate application) that runs in parallel with the runtime system 100 and is programmed to collect data (i.e., metrics) corresponding to the executed paths and branches. These metrics can indicate operational usefulness of each path or branch thereof. For example, one of the metrics can comprise the number of times each of the paths is activated, during each running of the runtime system, and also the number of times each of the branches within each of the paths is activated, during each running of the runtime system. These metrics can also indicate the cost associated with building each particular path and each particular branch within each path. For example, other metrics can include the amount of computer processing unit usage associated with building each of the paths and each of the branches within each path, the amount of time associated with building each of the paths and each of the branches within each path, and/or an actual cost associated with building each of the paths and each of the branches within each path. The monitor 130 can further be adapted to (i.e., operable to) store those collected metrics in a database 142 (e.g., within a data repository 140).

The analyzer 150 can be adapted to (i.e., operable to) access the database 142 and to perform a cost-benefit analysis using the collected metrics from one or more previous runnings of the runtime system 100 (e.g., to compare the operation usefulness of each path and/or each branch within each path with a cost associated with building each path and/or each branch within each path). For example, the path/branch activation numbers can be compared to a predetermined scale that is generic or that is specific to application(s) communicating over the bus. This scale can set a range of operational usefulness (e.g., <X not very useful, >X but <Y average usefulness, >Y very useful). Furthermore, the cost values can also be compared to a predetermined scale that is generic or that is specific to application(s) communicating over the bus. This scale can set a range of cost effectiveness (e.g., <A not very costly, >A but <B average cost, >C very costly). Thus, if the cost value is less than A and the path/branch activation numbers are greater than Y, the operational usefulness would outweigh the cost. However, if the cost value is greater than C, and the path/branch activation numbers are less than X, the cost would outweigh the operational usefulness. Preset standards can be used to determine when operational usefulness is outweighed by cost.

The processor 110 can further be adapted to (i.e., operable to) alter which paths and/or branches thereof are built at a subsequent restart of the runtime system 100, based on the results of the cost-benefit analysis, so as to ensure that the most advantageous path configuration is built. Specifically, the processor 110 and, particularly, the GRBD 112 can be programmed so that at a subsequent restart of the runtime system 100 and based on the results of the cost-benefit analysis, the RBB 111 is directed to and builds instantiations of only selected ones of the paths and the branches thereof (e.g., paths and branches for which operational usefulness outweighs building costs). Other paths and branches are built, during the running of the runtime system, by the RBB 111, as directed by the GRBD 112 and only as required (i.e., on-demand). All paths and branches built, either at the start of a given running of a runtime system 100 or on demand during the given running of the runtime system, will remain built at least until the runtime system 100 is restarted a next time.

Figure 2:
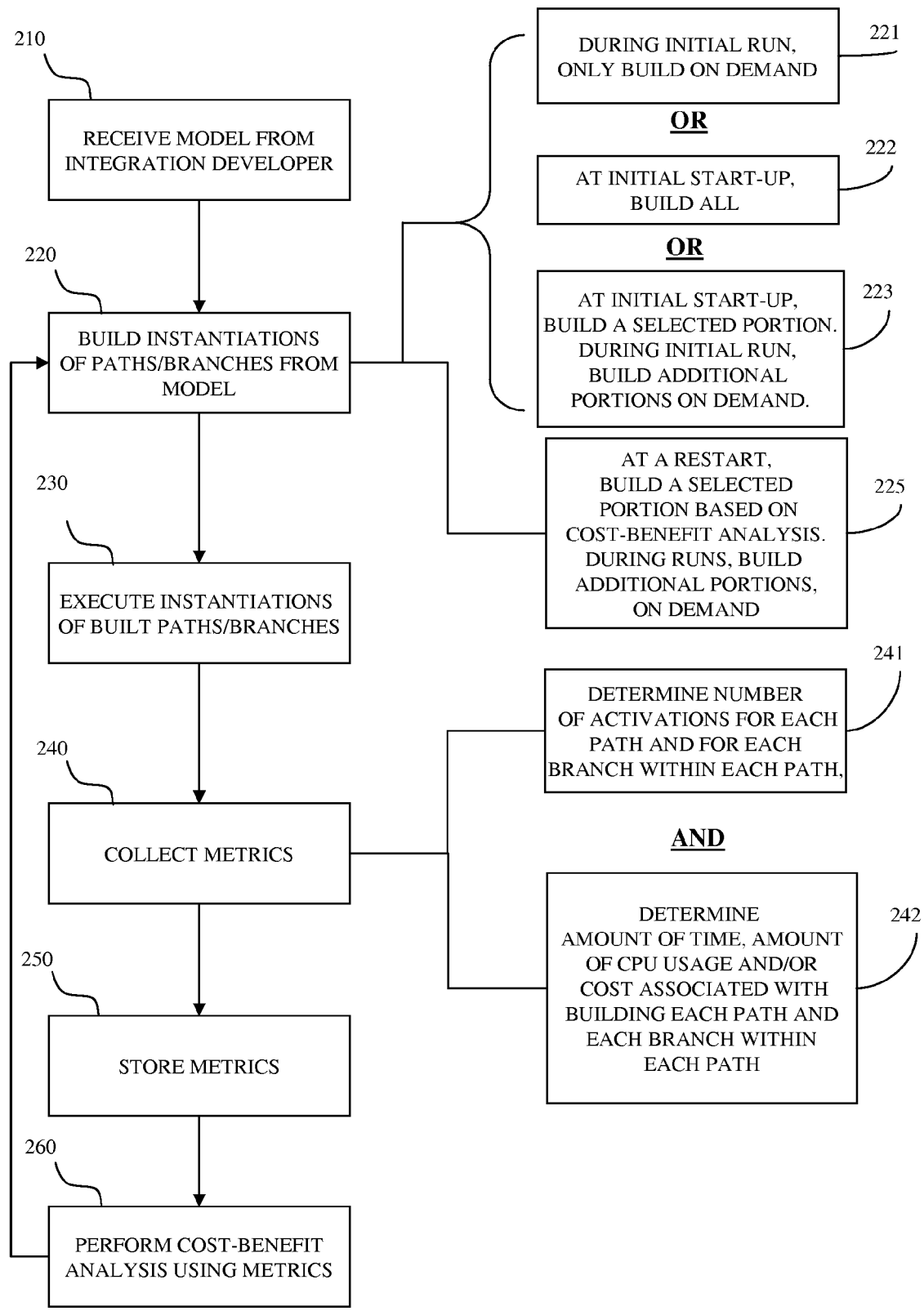
FIG. 2 is a flow diagram illustrating an embodiment of the method of the present invention.

Referring to FIG. 2 in combination with FIG. 1, also disclosed herein are embodiments of an adaptive enterprise service bus (ESB) runtime method. The method embodiments comprise receiving a model for an enterprise system bus (ESB) (e.g., from an integration developer 160) (210). This model can comprise a plurality of paths (i.e., mediation flows) that will enable communications across a bus 180 between multiple different composable units 170 (e.g., between different applications, between primitives (i.e., nodes or elements) within a single application, etc.). At least one of these paths can comprise a plurality of different branches (i.e., different routes) that can be used. The model specifically identifies each path and branch thereof.

Then, instantiations of the various paths and branches thereof are built at the initial start-up of the runtime system and/or on demand during an initial running of the runtime system (220). For example, during an initial running of the runtime system 100, paths and branches from the model can be built only as required (i.e., on-demand) (221). Alternatively, at an initial start-up of the runtime system 100, all of the paths and the branches from the model can be built (222). Alternatively (at process 223), a portion of the paths and branches from the model can be selected, based on pre-loaded historical data. Then, at the initial start-up of the runtime system 100 only that selected portion (i.e., a skeletal ESB architectural structure) can be built. However, during the initial running of the runtime system, any additional portions (i.e., non-selected portions) of the path and branches from the model that are required are built on-demand. The building process 220 can be performed by a process 110 and, more particularly, by a runtime branch builder (RBB) 111, as directed by a global runtime branch director (GRBD) 112, as discussed in detail above.

Next, during each running of a runtime system 100, built instantiations of the paths and the branches are executed (230). Furthermore, during this execution process, metrics for the paths and the branches thereof are collected (e.g., by a monitor 130) and stored (e.g., in a database 142 in a data repository 140) (240-250). The metrics can indicate operational usefulness of each path or branch thereof. For example, the process 240 of collecting metrics can comprise determining the number of times each of the paths is activated, during each running of the runtime system 100, and also determining the number of times each of the branches within each of the paths is activated, during each running of the runtime system (241). These metrics can also indicate the cost associated with building each particular path and each particular branch within each path. For example, the process 240 of collecting metrics can also comprise determining the amount of computer processing unit usage associated with building each of the paths and each of the branches within each path, determining the amount of time associated with building each of the paths and each of the branches within each path, and/or determining an actual cost associated with building each of the paths and each of the branches within each path (242).

After such metrics are collected and stored, a cost-benefit analysis can be performed using the metrics from one or more previous runnings of the runtime system 100 (e.g., to compare the operation usefulness of each path and/or each branch within each path with a cost associated with building each path and/or each branch within each path) (260). For example, the path/branch activation numbers can be compared to a predetermined scale that is generic or that is specific to application(s) communicating over the bus. This scale can set a range of operational usefulness (e.g., <X not very useful, >X but <Y average usefulness, >Y very useful). Furthermore, the cost values can also be compared to a predetermined scale that is generic or that is specific to application(s) communicating over the bus. This scale can set a range of cost effectiveness (e.g., <A not very costly, >A but <B average cost, >C very costly). Thus, if the cost value is less than A and the path/branch activation numbers are greater than Y, the operational usefulness would outweigh the cost. However, if the cost value is greater than C, and the path/branch activation numbers are less than X, the cost would outweigh the operational usefulness. Preset standards can be used to determine when operational usefulness is outweighed by cost.

Then, at a subsequent restart of the runtime system 100 and based on the results of the cost-benefit analysis, instantiations of only selected ones of the paths and the branches thereof are built (e.g., paths and branches for which operational usefulness outweighs building costs) (225). Other paths and branches are built only as required (i.e., on-demand), during running of the runtime system. All paths and branches built, either at the start of a given running of a runtime system or on demand during the given running of the runtime system, will remain built at least until the runtime system is restarted a next time.

Also disclosed herein are embodiments of a computer program product for the above-described adaptive enterprise service bus (ESB) runtime method. The computer program product comprises a computer usable medium having computer usable program code embodied therewith and this computer usable program code is configured to perform the above-described method. Specifically, the embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
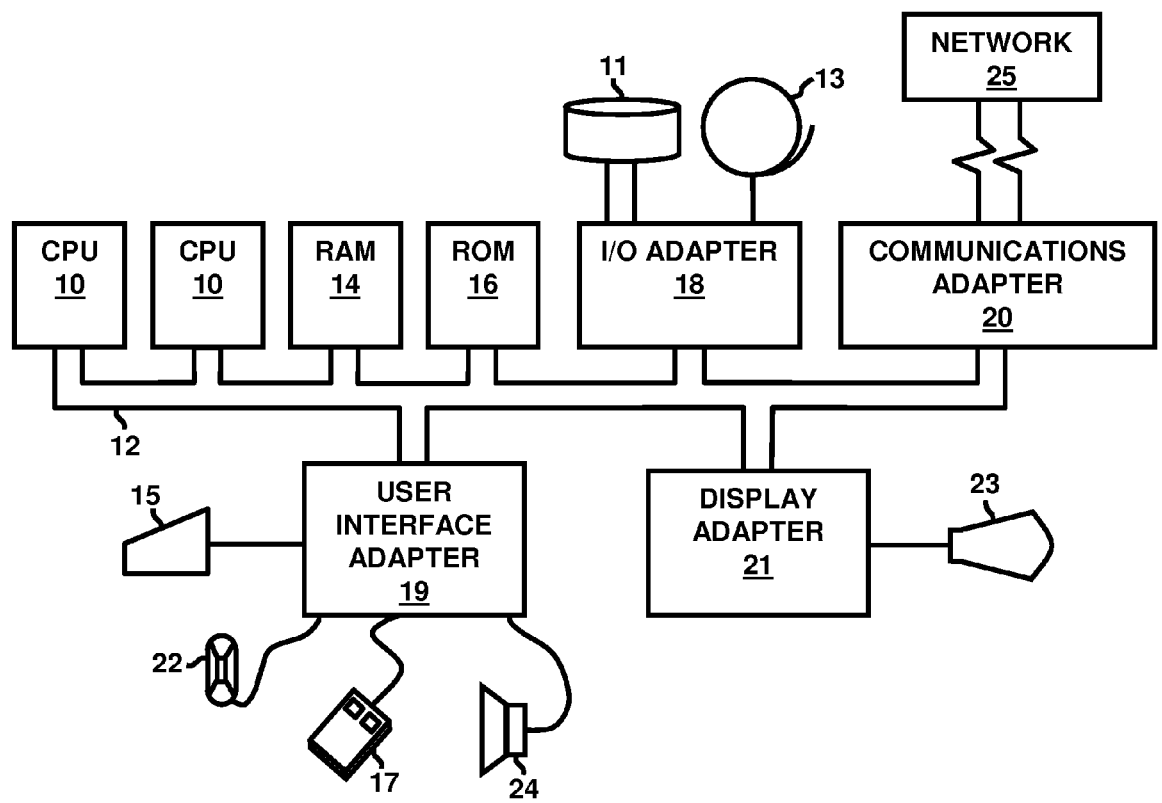
FIG. 3 is a schematic diagram illustrating an exemplary hardware environment that can be used to implement the embodiments of the invention.

A representative hardware environment for practicing the embodiments of the invention is depicted in FIG. 3. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the corresponding structures, materials, acts, and equivalents of all means or step plus function elements in the claims below are intended to include any structure, material, or act for performing the function in combination with other claimed elements as specifically claimed. Additionally, it should be understood that the above-description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. Well-known components and processing techniques are omitted in the above-description so as to not unnecessarily obscure the embodiments of the invention.

Finally, it should also be understood that the terminology used in the above-description is for the purpose of describing particular embodiments only and is not intended to be limiting of the invention. For example, as used herein, the singular forms "a", "an" and "the" are intended to include the plural forms as well, unless the context clearly indicates otherwise. Furthermore, as used herein, the terms "comprises", "comprising," and/or "incorporating" when used in this specification, specify the presence of stated features, integers, steps, operations, elements, and/or components, but do not preclude the presence or addition of one or more other features, integers, steps, operations, elements, components, and/or groups thereof.

Disclosed above are embodiments of an adaptive enterprise service bus (ESB) runtime system and an associated method, which build, at a restart, only the most advantageous path configuration between composable units (e.g., between applications and/or between primitives within a single application). Specifically, during the execution of instantiations of modeled paths and branches thereof, metrics (e.g., the number of times each flow and each branch are activated, the CPU usage associated with building each flow and each branch, etc.) are collected. Then, at a subsequent restart of the runtime system, a cost-benefit analysis is performed on the collected metrics and, based on the results of this cost-benefit analysis, only selected ones of the paths and the branches thereof are built (e.g., paths and branches for which operational usefulness outweighs building costs). Other paths and branches are built only as required, during running of the runtime system. Thus, the disclosed embodiments recognize poorly used paths and/or branches thereof and do not build those poorly used paths or branches thereof, thereby gaining performance improvement. Additionally, the disclosed embodiments are continuously active, altering which paths and branches thereof are built at each runtime and, in this way, are adaptive.

What is claimed is:

1. An adaptive enterprise service bus (ESB) runtime system comprising:
    a processor operable to receive a model for an enterprise system bus (ESB), said model comprising a plurality of paths between composable units with at least one of said paths comprising a plurality of branches and said processor being further operable to build executable instantiations of said paths and said branches;
    a server operable to execute, during each running of said runtime system, said executable instantiations of said paths and said branches built by said processor so as to allow communication between said composable units;
    a monitor collecting, during executing of said executable instantiations by said server, metrics associated with said paths and said branches; and,
    an analyzer receiving said metrics and performing a cost-benefit analysis based on said metrics,
    said processor further building, at a restart of said runtime system and based on results of said cost-benefit analysis, executable instantiations of only selected ones of said paths and said branches.

2. The system of claim 1, said processor, for an initial running of said runtime system, building executable instantiations of only required ones of said paths and said branches on-demand.

3. The system of claim 1, said processor, for an initial start-up of said runtime system, building executable instantiations of all of said paths and said branches.

4. The system of claim 1, said processor, at an initial start-up of said runtime system, selecting to build and building executable instantiations of only a portion of said paths and said branches, based on pre-loaded historical data, and
    said processor, after said initial start-up and during an initial running of said runtime system, further building executable instantiations of any additional portions of said paths and said branches, as required, on demand.

5. The system of claim 1, said processor further receiving said model from an integration developer.

6. The system of claim 1, said metrics comprising:
    a number of times each of said paths and each of said branches is activated, during each running of said runtime system; and
    at least one of an amount of computer processing unit usage associated with building each of said paths and each of said branches, an amount of time associated with building each of said paths and each of said branches and an actual cost associated with building each of said paths and each of said branches.

7. The system of claim 1, said processor ensuring that all executable instantiations of said paths and said branches built during a given running of said runtime system will remain built at least until said runtime system is restarted.

8. An adaptive enterprise service bus (ESB) runtime method, said method comprising:
    receiving, by a computer system, a model for an enterprise system bus (ESB), said model comprising a plurality of paths between composable units, at least one of said paths comprising a plurality of branches;
    building, by said computer system, executable instantiations of at least some of said paths and said branches;
    executing, by said computer system and during each running of a runtime system, at least some of said executable instantiations so as to allow communication between said composable units;
    during said executing of said at least some of said executable instantiations, collecting, by monitors in communication with said computer system, metrics associated with said paths and said branches; and
    performing, by said computer system, a cost-benefit analysis based on said metrics,
    said building further comprises building, at a restart of said runtime system and based on results of cost-benefit analysis, executable instantiations of only selected ones of said paths and said branches.

9. The method of claim 8, said building further comprising, after said receiving of said model and during an initial running of said runtime system, building executable instantiations of only required ones of said paths and said branches on demand.

10. The method of claim 8, said building further comprising, after said receiving of said model and at an initial start-up of said runtime system, building executable instantiations of all of said paths and said branches.

11. The method of claim 8, said building further comprising:
    after said receiving of said model, at an initial start-up of said runtime system, and based on pre-loaded historical data, selecting and building executable instantiations of only a portion of said paths and said branches; and
    during an initial running of said runtime system, further building executable instantiations of any additional portions of said paths and said branches as required, on demand.

12. The method of claim 8, said receiving of said model comprising receiving said model from an integration developer.

13. The method of claim 8, said collecting comprising:
   determining a number of times each of said paths and each of said branches is activated, during each running of said runtime system; and
   determining at least one of an amount of computer processing unit usage associated with building each of said paths and each of said branches, an amount of time associated with building each of said paths and each of said branches and an actual cost associated with building each of said paths and each of said branches.

14. The method of claim 8, further comprising ensuring that all executable instantiations of said paths and said branches built during a given running of said runtime system will remain built at least until said runtime system is restarted.

15. A computer program product comprising a non-transitory storage medium readable by a computer and storing computer usable program code executable by said computer to perform an adaptive enterprise service bus (ESB) runtime method, said adaptive enterprise service bus (ESB) runtime method comprising:
   receiving a model for an enterprise system bus (ESB), said model comprising a plurality of paths between composable units, at least one of said paths comprising a plurality of branches;
   building, by said computer, executable instantiations of at least some of said paths and said branches;
   executing, during each running of a runtime system, at least some of said executable instantiations so as to allow communication between said composable units;
   during said executing of said at least some of said executable instantiations, collecting, by monitors in communication with said computer, metrics associated with said paths and said branches; and
   performing, by said computer, a cost-benefit analysis based on said metrics,
   said building further comprising building, at a restart of said runtime system and based on results of a cost-benefit analysis, executable instantiations of only selected ones of said paths and said branches.

16. The computer program product of claim 15, said building further comprising, after said receiving of said model and during an initial running of said runtime system, building executable instantiations of only required ones of said paths and said branches, on demand.

17. The computer program product of claim 15, said building further comprising, after said receiving of said model and during an initial start-up of said runtime system, building executable instantiations of all of said paths and said branches.

18. The computer program product of claim 15, said building further comprising:
   after said receiving of said model, at an initial start-up of said runtime system, and based on pre-loaded historical data, selecting and building executable instantiations of only a portion of said paths and said branches; and
   during an initial running of said runtime system, building executable instantiations of any additional portions of said paths and said branches as required, on demand.

19. The computer program product of claim 15, said receiving of said model comprising receiving said model from an integration developer.

20. The computer program product of claim 15, said collecting comprising:
   determining a number of times each of said paths and each of said branches is activated, during each running of said runtime system; and
   determining at least one of an amount of computer processing unit usage associated with building each of said paths and each of said branches, an amount of time associated with building each of said paths and each of said branches and an actual cost associated with building each of said paths and each of said branches.

\* \* \* \* \*